| United States Patent [19] | [11] 4,020,303 |
| --- | --- |
| Jablonski et al. | [45] Apr. 26, 1977 |

[54] POLYIMIDES PREPARED FROM AMINE TERMINATED PREPOLYMERS AND OLEFIN CONTAINING ANHYDRIDES

[75] Inventors: Richard J. Jablonski, Scotia; Daniel Kruh, Schenectady, both of N.Y.

[73] Assignee: General Electric Company, Schenectady, N.Y.

[22] Filed: Dec. 16, 1971

[21] Appl. No.: 208,929

[52] U.S. Cl. .................. 260/78 UA; 260/47 UA; 260/47 CP; 260/78 TF

[51] Int. Cl.² .............. C08G 73/10; C08G 73/12

[58] Field of Search ...... 260/47 CP, 78 TF, 78 UA, 260/47 UA

[56] References Cited

UNITED STATES PATENTS

| 3,352,834 | 11/1967 | Schmitt et al. ................. 260/78 |
| 3,625,912 | 12/1971 | Vincent et al. ................ 260/30.2 |
| 3,652,511 | 3/1972 | Vincent et al. ............... 260/78 UA |
| 3,661,852 | 5/1972 | Flowers et al. ..................... 260/65 |
| 3,669,930 | 6/1972 | Asahara et al. ............... 260/47 CZ |
| 3,671,490 | 6/1972 | Bargain ......................... 260/47 CP |
| 3,708,459 | 1/1973 | Lubowitz ............................ 260/65 |

*Primary Examiner*—Lester L. Lee

[57] ABSTRACT

New and useful polymers are prepared by reacting olefin-terminated prepolymeric materials with simple polyamine, by reacting simple olefins with amine-terminated prepolymers and by reacting olefin-terminated prepolymers with amine-terminated prepolymers. The new and useful polymeric materials so obtained can be cured as with heat, with or without catalyst, to provide products useful for preparing films, laminates, composites, prepregs, molding materials, varnishes, wire enamels and the like.

9 Claims, No Drawings

POLYIMIDES PREPARED FROM AMINE TERMINATED PREPOLYMERS AND OLEFIN CONTAINING ANHYDRIDES COMPOSITIONS

This invention relates to new and useful polymeric materials which can be cured or cross-linked to provide compositions useful for preparing films, laminates, composites, prepregs, molding materials, varnishes, wire enamels and the like. More particularly, the invention relates to polymeric reaction products of olefin-terminated prepolymer materials with simple polyamine, by reacting simple olefins with amine-terminated prepolymers, and by reacting olefin-terminated prepolymers with amine-terminated prepolymers. The polymeric materials so obtained can be cured as with heat, with or without catalyst, to provide useful products including those mentioned above.

It has been known in the past to react simple polyamines such as diamines with simple bisolefins as pointed out, for example, in U.S. Pat. No. 3,562,223, Feb. 9, 1971. While such materials are possessed of useful properties, it has been found desirable to have materials which will be characterized by even more enhanced thermal and other physical properties and it is a primary object of this invention to provide such materials.

Briefly, according to the present invention, there are reacted together simple polyamines and olefin-terminated prepolymers or amine-terminated prepolymers and olefins such as bisolefins or amine-terminated prepolymers and olefin-terminated prepolymers to provide new polymeric materials which can be cured with heat, with or without the use of catalyst to provide useful products.

Those features of the invention which are believed to be novel are set forth with particularity in the claims appended hereto. The invention will, however, be better understood and further objects and advantages appreciated from a consideration of the following description.

Useful in connection with the present invention are simple polyamines expressed by the formula

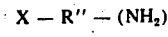

where R'' is an organic radical and n is at least 2 and X is hydrogen, an amino group or substituted or unsubstituted organic group including those also containing at least one amino group. The specific amines useful for the present invention, alone or in admixture, include but are not limited to the following:

p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
isomeric trimethyl hexamethylene diamine
para-bis(2-methyl-4-amino-pentyl)benzene
para-bis(1,1-dimethyl-5-amino-pentyl)benzene
m-xylylene diamine
polymethylene polyaniline of formula

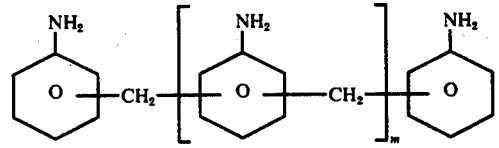

where m is from about 0.1 to 10 and preferably about 0.3.

Materials which have been found useful in reacting with polyamine to prepare amine-terminated prepolymers include diacids expressed by the formula

where R is an unsaturated or saturated, substituted or unsubstituted, aliphatic group containing from about 1 to 40 carbon atoms. Among such diacids are oxalic, succinic, glutaric, adipic, pimelic, suberic, azelaic, sebacic and dodecanedioic acids, as well as unsaturated acids falling within the above formula including maleic and fumaric acids, among others. Mixtures can, of course, be used. A dibasic acid having a chain thirty-six carbons long is Emery Industries, Inc. 3713-R Dimer Acid. Others will occur to those skilled in the art.

The group R in the above formula can also be an aromatic group providing materials typified by terephthalic and isophthalic acid. Anhydrides of such acids are useful as well.

Also useful as the acidic component are tricarboxylic acid anhydride materials which can be expressed by the following formula

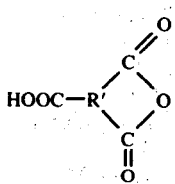

where R' is a trivalent organic radical. Among such materials which will occur to those skilled in the art are trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene 3,3',4-tricarboxylic anhydride; 3,4,10-propylene tricarboxylic anhydride; 3,4-dicarboxyphenyl 3-carboxyphenyl ether anhydride; ethylene tricarboxylic anhydride; 1,2,5-naphthalene tricarboxylic anhydride; etc. Also useful are the corresponding acids of such anhydrides. Where diacids are mentioned, such substitutions will be understood to be included.

The olefin group-containing material of the present invention is conveniently derived from anhydrides of the formula

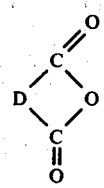

where D is an aliphatically unsaturated divalent organic radical

where Y is a radical selected from hydrogen, lower alkyl, halogen, or mixtures thereof, such as chloromethyl, ethyl, propyl, bromo, and the like. Examples of such materials include maleic anhydride, citraconic anhydride and itaconic anhydride, among others.

Also useful in the present respect are bisimides which can be expressed by the formula

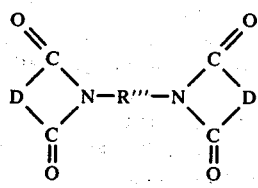

where R''' is a group containing at least two carbon atoms and D is as above. Materials of these types include, among others, maleic N,N'-ethylene-bis-imide, maleic N,N'-hexamethylene-bis-imide, maleic N,N'-metaphenylene-bis-imide, maleic N,N'-paraphenylene-bis-imide, maleic N,N'-4,4'-diphenylmethane-bis-imide, maleic N,N'-4,4'-diphenylether-bis-imide, maleic N,N'-4,4'-diphenylsulphone-bis-imide, maleic N,N'-4,4'-dicyclohexylmethane-bis-imide, maleic N,N'-α,α'-4,4'-dimethylenecyclohexane-bis-imide, maleic N,N'-metaxylylene-bis-imide, and maleic N,N'-4,4'-diphenylcyclohexane-bis-imide and their corresponding amide acids. Also useful are materials derived from polyfunctional amines such as polymethylene, polyaniline, and others.

Any non-reactive solvent which will satisfactorily dissolve the ingredients can be used including, among others, N,N'-dimethylacetamide and N-methylpyrrolidone, dimethyl formamide, cresylic acid and compatible mixtures of such with hydrocarbon and other compatible solvents.

The ingredients can be used in equivalent proportions or with an excess of olefin material.

The following examples will illustrate the practice of the present invention, it being understood that they are not to be taken as limiting in any way.

EXAMPLE A

This example illustrates the preparation of amine-terminated prepolymer. Under nitrogen and anhydrous conditions, a solution of trimellitic anhydride monoacid chloride (TMAC) (13.47 g, 64 m moles) in dry N,N'-dimethylacetamide (DMAC) was added at −20° C during 10 minutes to a stirred solution of triethylamine (6.46 g, 64 m moles) and methylene dianiline (MDA)(15.84 g, 80 m moles) in DMAC to give a solution containing 108 g of DMAC and precipitated triethylamine hydrochloride. The mixture was stirred without the cooling bath for 1 hour, cooled to 0° C, and filtered to remove triethylamine hydrochloride (8.5 g). The solution was refrigerated and portions used as such as required.

EXAMPLE B

The olefin terminated prepolymer is prepared by reacting amine terminated prepolymer with an olefin containing material having an amine reactive functional group. This particular example illustrates the preparation of a maleimide-terminated prepolymer. A solution prepared by the procedure of Example A was used as follows. The solution was cooled to −20° C and treated with a solution of maleic anhydride (3.45 g, 35.2 m moles) in DMAC (15.84 g). The resulting solution was diluted with DMAC (14.87 g) and stored at room temperature overnight. Sodium acetate (1.11 g) and acetic anhydride (19.58 g) were added and the solution was kept at 53°–56° C for 2 hours, cooled and stirred 4 hours, left overnight, precipitated into water, washed and dried to give 26.5 g of solids.

EXAMPLE C

This example illustrated the preparation of amine-terminated prepolymer using trimellitic anhydride (TMA) as the acidic constituent. A solution of MDA (297 g, 1.5 mole) in N-methylpyrrolidone (MP) (207.5 g) containing xylene was treated at 180° C with TMA (230.4 g, 1.09 moles) added portionwise. Heating was continued for 21 hours at 150°–210° C using triethyl phosphite (1.5 g added as 3 portions) as a catalyst. Titration of residual carboxyl showed the reaction to be essentially 100 percent complete. The product was diluted to 25% solids with MP and used as such.

EXAMPLE D

This example illustrates the preparation of maleimide-terminated prepolymer from the material of Example C. A portion (472 g) of the above solution was treated with stirring under nitrogen at 40° C with maleic anhydride (15.7 g, 0.16 mole). Then acetic anhydride (32.6 g) and sodium acetate (1.8 g) were added and the solution was kept at 55°–58° C for 2 hours, cooled, allowed to sit overnight, precipitated into water, filtered, washed, and dried to give 128 g of solids product.

EXAMPLE E

This example illustrates the in situ preparation of 4,4'-bis(trimellitimido) diphenylmethane and its use as a monomer to give a polyamide-imide polyamine. Under nitrogen and anhydrous conditions, MDA (59.4 g) was added at 100° C to a stirred solution of TMA (115.2 g) in MP solvent (174.6 g) containing xylene. Water (10.8 g) was collected during 2.5 hours in the range of 137°–186° C. This solution was cooled to 155° C and MDA(90.1 g) and triphenyl phosphite (0.5 g) were added. The system was heated at 170°–210° C for 18 hours. The reaction was essentially 100% complete by titration for residual carboxylic acid. After cooling, the solution was diluted with 483 g of MP and used as such.

EXAMPLE 1

A maleimide-terminated amide-imide prepolymer was made by the procedure of Example B except that the mole ratio of MDA:TMAC was 2:1. Then, 25 g (35.1 m moles) of the above solid was added with stirring under nitrogen to 111.2 g of dimethyl acetamide (DMAC) followed by 2.8 g (17.6 m moles) of trimethylhexamethylenediamine. The solution was heated to 50° C, treated with 0.03 g of hydroquinone, heated to 125° C, held for one hour, allowed to cool, precipitated into water with a Waring Blender, filtered, washed and dried. By differential thermal analysis (DTA), the glass transition temperature (Tg) of the powder was 170°–175° C.

A one-gram portion of the powder was placed between sheets of aluminum foil, in turn between press plates, and in turn between 4-ply of padding for each plate. A thermo-couple was used to measure temperature on an electrically heated press, and the sample was heated with contact pressure. Flow was observed at 150°–185° C. Then the sample was pressed at 10,000 psi and 220°–245° C for 15 minutes, cooled, and removed to give a strong and flexible, transparent red film 21 mils thick.

EXAMPLE 2

A sample of the maleimide-terminated prepolymer (25 g, 35.1 m moles) as used in Example 1 was dissolved in DMAC (111.2 g) and treated by the process of Example 1 with a blend of diamines consisting of m-phenylenediamine (0.8 g, 7.04 m moles), methylenedianiline (1.4 g, 7.04 m moles), and trimethylhexamethylenediamine (0.6 g, 3.52 mmols) and then hydroquinone (0.03 g). After heating as in Example 1 and obtaining the powdered product, the Tg was found to be about 140° C by Differential Thermal Analysis (DTA). A 1 g sample was molded as in Example 1, a pressure drop being observed at 275°–320° F. The sample was held at 375°–450° F for 15 minutes at 4000 psi.

A transparent 13-mil orange film which was very strong and flexible was obtained.

EXAMPLE 3

Using a maleimide-terminated prepolymer prepared by the procedure of Example B, a portion (25 g, 14.1 m moles) was dissolved in DMAC (103.2 g) and reacted as in Example 1 with m-phenylenediamine (0.8 g, 7 m moles) and hydroquinone (0.03 g). The powdered reaction product was molded as in Example 1. A pressure drop was observed at 155°–220° C and the sample was pressed at 220°–290° C for 10 minutes at 10,000 psi. A dark orange transparent film was obtained which was very strong and flexible.

EXAMPLE 4

A sample of the maleimide-terminated prepolymer (25 g, 14.1 m moles) as used in Example 3, oxydianiline (1.4 g, 7 m moles) and hydroquinone (0.03 g) in DMAC (105.6 g) were reacted and isolated as in Example 1. The product had a Tg of about 180° C. On molding a 1 g sample as in Example 1, a pressure drop was observed at 150°–180° C with contact pressure. The sample was pressed at 215°–275° C for 17 minutes at 10,000 psi to give a strong and flexible transparent orange film.

EXAMPLE 5

A sample of the maleimide-terminated material (25 g, 14.1 m moles) used as in Example 4 was treated with diaminodiphenylsulfone (1.7 g, 7 m moles) in DMAC (106.8 g) with hydroquinone as in Example 1. A portion of the product (1 g) was molded as in Example 1. A pressure drop at 140°–200° C was observed. The sample was pressed at 240°–265° C for 12 minutes at 10,000 psi to give a brownish-orange strong and transparent film.

EXAMPLE 6

A sample of maleimide-terminated prepolymer (11.4 g, 4 m moles) prepared by the procedure of Example B where the MDA:TMA-acid chloride molar ratio was 8:7 was dissolved in 50 ml of N-methylpyrrolidone (MP), heated to 155° C, treated with MDA (0.4 g, 2 m moles) with stirring, held at 110°–125° C for 40 minutes, cooled, precipitated into water, filtered, washed, and dried. Films were cast from dimethylformamide (DMF) and were flexible after curing.

EXAMPLE 7

The intermediate prepolymer diamine used in this example was prepared by the procedure of Example A from 2 moles of methylene dianiline and 1 mole of trimellitic anhydride acid chloride. Into a flask were placed 3.8 g (0.0067 mole) of the prepolymer diamine, 18.7 g (0.052 mole) of the bismaleimide of methylene dianiline and 60 ml of DMF. The solution was heated to 100° C and 25 ml of xylene and 10 ml of DMAC were added. The temperature was increased to 150° C and maintained there for 40 minutes. Methanol (160 ml) and DMF (100 ml) were added. The product was isolated by precipitation into 1100 ml of a 10:1 mixture of methanol/water, collected by filtration, slurried twice in benzene, collected by filtration and dried. Analysis of the product's infrared spectrum indicated that the desired reaction had taken place. The powder was molded at 240° C and 3,000 psi for 20 minutes to produce a bar.

EXAMPLE 8

The intermediate prepolymer diamine was prepared by the procedure of Example A from 2 moles of methylene dianiline and 1 mole of isophthaloyl chloride. The prepolymer diamine (10.0 g, 0.01 mole) was dissolved with stirring at about 115° C into 300 ml of DMF which contained 1.4 g of lithium chloride to aid dissolution. The bismaleimide of methylene dianiline (13.3 g, 0.037 mole) was added and the temperature maintained for 45 minutes. The reaction mixture was allowed to cool to 40° C. The product was isolated by precipitation into water followed by collection by filtration. The product was slurried with acetone to aid drying, collected by filtration, washed with benzene and then with hexane prior to drying. Cured molded parts were made from this product.

EXAMPLE 9

Into a flask were placed 104 g of a DMAC solution containing 16.6 (0.0059 mole) of a prepolymer amine prepared from 8 moles of methylene dianiline and 7 moles of trimellitic anhydride mono acid chloride by the procedure of Example A. Eighty cc of xylene were added and ring closure of the amic acid to the imide was accomplished (as determined by infrared analysis) by azeotropic distillation. To this solution at 115° C were added 3.6 g (0.010 mole) of the bismaleimide of methylene dianiline. An immediate color change was noted. The reaction mixture was kept at 110°–120° C for 40 minutes prior to precipitation of the product via dripping into 1.5 liters of water. The yellow solid was collected by filtration, washed with water and then hexane prior to drying. The product was found to be soluble in polar solvents. Films were cast from DMF at 30 percent solids on glass. They were cured for 0.5 hour at 120° C, 1 hour at 200° C and finally at 1.5 hours at 250° C. These films were flexible.

EXAMPLE 10

The prepolymer bismaleimide (11.4 g) prepared from MDA and trimellitic anhydride, monoacid chloride in a ratio of 8:7 followed by treatment with maleic anhydride and subsequent ring closure using the procedure of Example B was dissolved in 50 ml of N-methylpyrrolidone. The solution was heated to 115° C and 0.4 g (0.002 mole) of MDA was added with stirring. The solution darkened. After heating (110–125° C) for 40 minutes, the solution was cooled to 40° C and then dripped into 300 ml of water. The resulting yellowish solid was collected by filtration and washed with water and then hexane prior to drying. The product was found to be soluble in polar solvents. Films cast from dimethylformamide solution on glass slides were found to be flexible after curing and removal from the glass.

EXAMPLE 11

An amine-terminated prepolymer solution made by the procedure of Example C (50.5 g, containing 7.88 m moles of diamine) was heated to 115°–120° C and treated with a solution of 4,4'-bismaleimidodiphenylmethane (5.66 g, 15.8 m moles) in N-methylpyrrolidone (104.2 g) and kept at 112°–115° C for 1.75 hours. The product was precipitated, filtered, washed and dried to give 15.5 g of product. The glass transition temperature (Tg) was 190° C by differential thermal analysis (DTA). By thermal gravimetric analysis (TGA) in air (heating rate 4.5° C/min.), the powder had a $T_{20}$ (temperature at 20 percent weight loss) of 470° C. Cured, flexible films and tough molded articles are prepared from this composition.

EXAMPLE 12

A maleimide-terminated prepolymer solid made by the procedure of Example D (20 0g, 11.3 m moles) was dissolved in N-methylpyrrolidone (70 g). At 113° C, a solution of MDA (1.1 g) in NMP (50 g) was added with stirring. After keeping the solution at 110°–112° C for 20 minutes, the product was precipitated, filtered, washed, and dried to give 18.7 g of product. By TGA as in Example 10, the powder had a $T_{20}$ of 450° C. Cured, flexible films and tough molded articles were prepared from this composition.

EXAMPLE 13

A portion of the solution made by Example E (31.15 g containing 4.92 m moles of diamine) was diluted with MP solvent (16.22 g), then treated with a solid maleimide-terminated prepolymer made by the procedure of Example D (8.728 g, 4.92 m moles), rolled in a jar for 20 minutes at room temperature, placed in a 110° C oven for 25 minutes, rolled for 35 minutes further to give a dark solution.

A film was cast on a glass plate and cured one hour each at 120, 200, 250° C, and 15 minutes at 316° C. The film was removed by soaking in hot water for two hours and was flexible.

EXAMPLE 14

A mixture of MDA (990 g, 5 moles), TMA (777.6 g, 4.05 moles), azelaic acid (84.6 g, 0.45 mole), a cresol-phenol solvent (794 g) and xylene (175 ml) was heated for 13.5 hours in the range of 130°–200° C with a collection of water of condensation. The product was diluted witn 1,984.5 g of cresol-phenol solvent.

A second reaction was run using MDA (594 g, 3 moles), TMA (466.6 g, 2.43 moles), azelaic acid (50.8 g, 0.27 mole), cresol-phenol solvent (476 g) and xylene (100 ml). Water of condensation was collected during nine hours in the range of 140°–200° C. The product was diluted with 1191 g of cresol-phenol solvent.

The two reaction products were combined and diluted further with 1712 g of cresol-phenol solvent. The solids content was determined to be 34 percent.

A 50 g sample of the 34 percent solution (containing 5 m moles of diamine) was diluted with 32 g of cresol-phenol solvent in a small Waring Blender and stirred for 4 minutes. 4,4'-bismaleimidodiphenylmethane (2.2 g, 6.1 m moles) was added at 55° C with stirring. Stirring was continued 2 minutes further with the temperature at 60° C. The solution was drained into a jar. A sample was baked for 15 minutes at 200° C in an aluminum cup. The film was flexible to a 180° C bend and strongly adhered to the cup.

The solution was heated for 2¼ hours in a 120° C oven. It was then coated on copper wire and cured on a wire tower to give a film of 1.8 mil build which had cut-through of 300° C The present materials are useful as electrical insulating films, wire enamels, molding powders and adhesives. They are also useful in the preparation of laminates and composite materials.

What we claim as new and desire to secure by Letters Patent of the United States is:

1. A polymer selected from (a) the reaction product of (1) amine terminated prepolymer prepared by reacting a material selected from dicarboxylic acid, dicarboxylic acid anhydride, tricarboxylic acid and tricarboxylic acid anhydride with simple polyamine having the formula

I  X—R''—(NH$_2$)

where R'' is an organic radical, $n$ is at least 2 and X is selected from hydrogen, amino group, substituted organic groups and unsubstituted organic groups and (2) simple olefin selected from the group consisting of

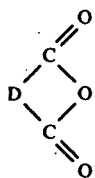

II where D is an aliphatically unsaturated divalent organic radical and

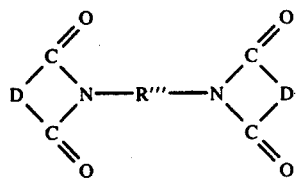

III where R''' is a group containing at least two carbon atoms and D is as above, (b) the reaction product of (1) olefin terminated prepolymer prepared by reacting the amine terminated prepolymer of (a) above with simple olefin selected from the olefins of Formulas II and III above and (2) simple polyamine as in Formula I above, (c) the reaction product of amine terminated prepolymer as in (a) above and olefin terminated prepolymer as in (b), about equivalent proportions of the polymer forming reactants being used.

2. A polymer as in claim 1 wherein said amine terminated prepolymer is the reaction product of acidic containing material selected from diacid and tricarboxylic acid material and simple polyamine selected from metaphenylene diamine, methylene dianiline, diaminodiphenyl sulfone and oxydianiline.

3. A polymer as in claim 1 wherein said amine terminated prepolymer is the reaction product of material selected from oxalic, succinic, azelaic, adipic, glutaric, pimelic, sebacic, maleic, fumaric, terephthalic, isophthalic and trimellitic acid and anhydride and mixtures thereof and simple polyamine.

4. A polymer as in claim 1 wherein said simple olefin is bismaleimide.

5. A polymer as in claim 1 wherein said simple olefin is maleimide.

6. A polymer as in claim 1 wherein said amine terminated prepolymer is prepared by reacting trimellitic anhydride and metaphenylene diamine.

7. A polymer as in claim 1 wherein said simple amine is metaphenylene diamine.

8. A polymer as in claim 1 wherein said simple amine is methylene dianiline.

9. A polymer as in claim 1 wherein said simple amine is diaminodiphenylsulfone.

* * * * *

UNITED STATES PATENT OFFICE
CERTIFICATE OF CORRECTION

PATENT NO. : 4,020,303
DATED : April 26, 1977
INVENTOR(S) : Richard J. Jablonski and Daniel Kruh It is certified that error appears in the above-identified patent and that said Letters Patent are hereby corrected as shown below:

Claim 1, delete "I" and place to right of formula to conform to "II" and "III"

Claim 1, formula I, insert a sub "n" after the final parenthesis of the formula

Signed and Sealed this

Thirteenth Day of September 1977

[SEAL]

Attest:

RUTH C. MASON
Attesting Officer

LUTRELLE F. PARKER
Acting Commissioner of Patents and Trademarks